US012533239B2

(12) United States Patent
Westrich et al.

(10) Patent No.: US 12,533,239 B2
(45) Date of Patent: Jan. 27, 2026

(54) CONICAL PATELLA RESURFACING

(71) Applicant: Howmedica Osteonics Corp., Mahwah, NJ (US)

(72) Inventors: Geoff Westrich, New York, NY (US); Gokce Yildirim, Weehawken, NJ (US)

(73) Assignee: Howmedica Osteonics Corp., Mahwah, NJ (US)

( * ) Notice: Subject to any disclaimer, the term of this patent is extended or adjusted under 35 U.S.C. 154(b) by 400 days.

(21) Appl. No.: 16/165,342

(22) Filed: Oct. 19, 2018

(65) Prior Publication Data

US 2019/0133775 A1    May 9, 2019

Related U.S. Application Data

(60) Provisional application No. 62/581,081, filed on Nov. 3, 2017.

(51) Int. Cl.
| | |
|---|---|
| *A61F 2/38* | (2006.01) |
| *A61B 17/16* | (2006.01) |
| *A61B 17/17* | (2006.01) |
| *A61F 2/30* | (2006.01) |
| *A61B 34/10* | (2016.01) |

(52) U.S. Cl.
CPC ........ *A61F 2/3877* (2013.01); *A61B 17/1677* (2013.01); *A61B 17/1703* (2013.01); *A61B 17/1767* (2013.01); *A61F 2/30749* (2013.01); *A61F 2/30771* (2013.01); *A61B 17/1659* (2013.01); *A61B 2034/102* (2016.02); *A61F 2002/30125* (2013.01); *A61F 2002/30205* (2013.01); *A61F 2002/3092* (2013.01); *A61F 2002/3881* (2013.01)

(58) Field of Classification Search
CPC ................ A61F 2/3877; A61F 2/30771; A61F 2/30749; A61F 2002/3881; A61F 2002/30205; A61F 2002/3092; A61F 2002/30125; A61B 17/1677; A61B 17/1703; A61B 17/1767; A61B 2034/102; A61B 17/1659
See application file for complete search history.

(56) References Cited

U.S. PATENT DOCUMENTS

| | | |
|---|---|---|
| 3,806,961 A | 4/1974 | Muller |
| 3,878,566 A | 4/1975 | Bechtol |

(Continued)

FOREIGN PATENT DOCUMENTS

| | | |
|---|---|---|
| DE | 3332354 A1 | 3/1985 |
| DE | 4221006 A1 | 1/1994 |

(Continued)

*Primary Examiner* — Sarah W Aleman
*Assistant Examiner* — Melissa A Hoban
(74) *Attorney, Agent, or Firm* — Lerner David LLP

(57) ABSTRACT

Disclosed herein are patellar implants and methods to prepare bone for receiving the same. The patellar implant may include an articulating surface and an anterior surface with a non-planar surface to engage with a resected patella. The non-planar surface may include a conically shaped portion to receive the resected patellar bone. A method for resurfacing a patella to implant a patellar implant having a recessed anterior surface may include the steps of determining the minimum implant and resection depth, medial and lateral patellar slope angles to select and resect with a symmetrical reamer.

16 Claims, 10 Drawing Sheets

(56) References Cited

U.S. PATENT DOCUMENTS

| | | | |
|---|---|---|---|
| 3,927,423 A | 12/1975 | Swanson | |
| 3,964,106 A | 6/1976 | Hutter, Jr. et al. | |
| 4,007,495 A | 2/1977 | Frazier | |
| 4,041,550 A | 8/1977 | Frazier | |
| 4,094,017 A | 6/1978 | Matthews et al. | |
| 4,151,615 A | 5/1979 | Hall | |
| 4,158,894 A | 6/1979 | Worrell | |
| 4,240,162 A | 12/1980 | Devas | |
| 4,285,070 A | 8/1981 | Averill | |
| 4,309,778 A | 1/1982 | Buechel et al. | |
| 4,340,978 A | 7/1982 | Buechel et al. | |
| 4,344,192 A | 8/1982 | Imbert | |
| 4,470,158 A * | 9/1984 | Pappas | A61F 2/3804 |
| | | | 623/20.21 |
| 4,479,271 A | 10/1984 | Bolesky et al. | |
| 4,633,862 A | 1/1987 | Petersen | |
| 4,650,490 A | 3/1987 | Figgie, III | |
| 4,706,660 A | 11/1987 | Petersen | |
| 4,888,021 A | 12/1989 | Forte et al. | |
| 4,944,756 A | 7/1990 | Kenna | |
| 4,964,867 A * | 10/1990 | Boger | A61F 2/3877 |
| | | | 623/20.18 |
| 4,979,957 A | 12/1990 | Hodorek | |
| 4,997,445 A | 3/1991 | Hodorek | |
| 5,011,496 A | 4/1991 | Forte et al. | |
| 5,019,104 A | 5/1991 | Whiteside et al. | |
| 5,021,061 A | 6/1991 | Wevers et al. | |
| 5,024,670 A * | 6/1991 | Smith | A61F 2/3877 |
| | | | 128/898 |
| 5,035,700 A | 7/1991 | Kenna | |
| 5,129,908 A | 7/1992 | Petersen | |
| 5,133,758 A | 7/1992 | Hollister | |
| 5,180,384 A | 1/1993 | Mikhail | |
| 5,181,924 A | 1/1993 | Gschwend et al. | |
| 5,197,986 A | 3/1993 | Mikhail | |
| 5,222,955 A | 6/1993 | Mikhail | |
| 5,236,462 A | 8/1993 | Mikhail | |
| 5,246,460 A | 9/1993 | Goodfellow et al. | |
| 5,330,532 A | 7/1994 | Ranawat | |
| 5,358,529 A | 10/1994 | Davidson | |
| 5,383,937 A | 1/1995 | Mikhail | |
| 5,395,401 A | 3/1995 | Bahler | |
| 5,425,775 A | 6/1995 | Kovacevic et al. | |
| 5,480,443 A | 1/1996 | Elias | |
| 5,514,183 A | 5/1996 | Epstein et al. | |
| 5,522,901 A | 6/1996 | Thomas et al. | |
| 5,580,353 A | 12/1996 | Mendes et al. | |
| 5,593,450 A | 1/1997 | Scott et al. | |
| 5,609,640 A | 3/1997 | Johnson | |
| 5,609,644 A | 3/1997 | Ashby et al. | |
| 5,624,462 A | 4/1997 | Bonutti | |
| 5,702,465 A | 12/1997 | Burkinshaw | |
| 5,702,467 A | 12/1997 | Gabriel et al. | |
| 5,723,016 A | 3/1998 | Minns et al. | |
| 5,725,584 A | 3/1998 | Walker et al. | |
| 5,728,162 A | 3/1998 | Eckhoff | |
| 5,871,539 A | 2/1999 | Pappas | |
| 5,871,540 A | 2/1999 | Weissman et al. | |
| 5,871,541 A | 2/1999 | Gerber | |
| 5,989,472 A | 11/1999 | Ashby et al. | |
| 6,102,955 A | 8/2000 | Mendes et al. | |
| 6,146,423 A | 11/2000 | Cohen et al. | |
| 6,190,391 B1 | 2/2001 | Stubbs | |
| 6,190,415 B1 | 2/2001 | Cooke et al. | |
| 6,217,617 B1 | 4/2001 | Bonutti | |
| 6,315,798 B1 | 11/2001 | Ashby et al. | |
| 6,506,193 B1 | 1/2003 | Stubbs | |
| 6,602,292 B2 | 8/2003 | Burkinshaw | |
| 6,616,696 B1 | 9/2003 | Merchant | |
| 6,709,460 B2 | 3/2004 | Merchant | |
| 6,800,094 B2 | 10/2004 | Burkinshaw | |
| 6,802,864 B2 | 10/2004 | Tornier | |
| 6,846,329 B2 | 1/2005 | McMinn | |
| 6,855,150 B1 | 2/2005 | Linehan | |
| 6,916,341 B2 | 7/2005 | Rolston | |
| 7,208,222 B2 | 4/2007 | Rolfe et al. | |
| 7,258,701 B2 | 8/2007 | Aram et al. | |
| 7,476,250 B1 | 1/2009 | Mansmann | |
| 7,517,365 B2 | 4/2009 | Carignan et al. | |
| 7,572,295 B2 | 8/2009 | Steinberg | |
| 7,691,149 B2 | 4/2010 | Brown et al. | |
| 7,713,305 B2 | 5/2010 | Ek | |
| 7,749,276 B2 | 7/2010 | Fitz | |
| 7,758,651 B2 | 7/2010 | Chauhan et al. | |
| 7,806,896 B1 | 10/2010 | Bonutti | |
| 7,837,736 B2 | 11/2010 | Bonutti | |
| 7,867,236 B2 | 1/2011 | Hodorek et al. | |
| 7,896,885 B2 * | 3/2011 | Miniaci | A61B 17/1668 |
| | | | 606/96 |
| 7,931,690 B1 | 4/2011 | Bonutti | |
| 7,972,383 B2 | 7/2011 | Goldstein et al. | |
| 8,002,839 B2 | 8/2011 | Rochetin et al. | |
| 8,062,302 B2 | 11/2011 | Lang et al. | |
| 8,092,544 B2 | 1/2012 | Wright et al. | |
| 8,105,330 B2 | 1/2012 | Fitz et al. | |
| 8,133,233 B2 | 3/2012 | Fitz | |
| 8,142,509 B2 | 3/2012 | McKinnon et al. | |
| 8,182,542 B2 | 5/2012 | Ferko | |
| 8,216,319 B2 | 7/2012 | Rhodes | |
| 8,226,725 B2 | 7/2012 | Ferko | |
| 8,268,005 B2 | 9/2012 | Brown et al. | |
| 8,282,685 B2 | 10/2012 | Rochetin et al. | |
| 8,292,965 B2 | 10/2012 | Walker | |
| 8,337,501 B2 | 12/2012 | Fitz et al. | |
| 8,361,160 B2 | 1/2013 | Haechler et al. | |
| 8,460,392 B2 | 6/2013 | Wright et al. | |
| 8,506,639 B2 | 8/2013 | Hayden et al. | |
| 8,545,569 B2 | 10/2013 | Fitz et al. | |
| 8,556,981 B2 * | 10/2013 | Jones | B22F 3/1109 |
| | | | 623/20.17 |
| 8,556,982 B2 | 10/2013 | Wright et al. | |
| 8,585,708 B2 | 11/2013 | Fitz et al. | |
| 8,632,552 B2 | 1/2014 | Bonutti | |
| 8,657,827 B2 | 2/2014 | Fitz et al. | |
| 8,682,052 B2 | 3/2014 | Fitz et al. | |
| 8,690,945 B2 | 4/2014 | Fitz et al. | |
| 8,696,754 B2 | 4/2014 | Cuckler et al. | |
| 8,747,478 B2 | 6/2014 | Ries et al. | |
| 8,808,386 B2 | 8/2014 | Engh et al. | |
| 8,814,946 B2 | 8/2014 | Steinberg | |
| 8,834,574 B2 | 9/2014 | Todd et al. | |
| 8,888,858 B2 | 11/2014 | Brown et al. | |
| 8,945,135 B2 | 2/2015 | Ries et al. | |
| 8,961,529 B2 | 2/2015 | Carignan et al. | |
| 8,986,306 B2 | 3/2015 | Wright et al. | |
| 9,020,788 B2 | 4/2015 | Lang et al. | |
| 9,023,050 B2 | 5/2015 | Lang et al. | |
| 9,078,676 B2 | 7/2015 | Randle et al. | |
| 9,078,772 B2 | 7/2015 | Jones et al. | |
| 9,107,680 B2 | 8/2015 | Fitz et al. | |
| 9,125,749 B2 | 9/2015 | Amirouche et al. | |
| 9,138,241 B2 | 9/2015 | Kuczynski | |
| 9,138,322 B2 | 9/2015 | Wright et al. | |
| 9,180,015 B2 | 11/2015 | Fitz et al. | |
| 9,186,161 B2 | 11/2015 | Lang et al. | |
| 9,186,254 B2 | 11/2015 | Fitz et al. | |
| 9,289,305 B2 | 3/2016 | Dacus | |
| 9,314,342 B2 | 4/2016 | Andriacchi et al. | |
| 9,333,085 B2 | 5/2016 | Fitz et al. | |
| 9,381,085 B2 | 7/2016 | Axelson, Jr. et al. | |
| 9,393,124 B2 | 7/2016 | Angibaud | |
| 9,486,321 B1 | 11/2016 | Smith et al. | |
| 9,498,342 B2 | 11/2016 | Wright et al. | |
| 9,554,813 B2 | 1/2017 | Clever et al. | |
| 9,572,672 B2 | 2/2017 | Sharkey | |
| 2001/0023371 A1 | 9/2001 | Bonutti | |
| 2003/0033018 A1 | 2/2003 | Merchant | |
| 2003/0083751 A1 | 5/2003 | Tornier | |
| 2003/0088315 A1 | 5/2003 | Supinski | |
| 2003/0120346 A1 | 6/2003 | Mercinek et al. | |
| 2003/0181984 A1 | 9/2003 | Abendschein | |
| 2004/0143336 A1 | 7/2004 | Burkinshaw | |
| 2004/0143338 A1 | 7/2004 | Burkinshaw et al. | |
| 2004/0236428 A1 | 11/2004 | Burkinshaw et al. | |

(56) References Cited

U.S. PATENT DOCUMENTS

| | | |
|---|---|---|
| 2004/0247641 A1 | 12/2004 | Felt et al. |
| 2004/0254645 A1 | 12/2004 | Arnin et al. |
| 2005/0085915 A1* | 4/2005 | Steinberg .............. A61F 2/3609 623/17.16 |
| 2005/0112397 A1* | 5/2005 | Rolfe .................. A61B 17/866 428/593 |
| 2005/0143830 A1 | 6/2005 | Marcinek et al. |
| 2005/0143833 A1 | 6/2005 | Merchant |
| 2005/0171612 A1 | 8/2005 | Rolston |
| 2005/0246028 A1 | 11/2005 | Pappas et al. |
| 2006/0052792 A1 | 3/2006 | Boettiger et al. |
| 2007/0100447 A1 | 5/2007 | Steinberg |
| 2007/0100460 A1 | 5/2007 | Rhodes |
| 2007/0100461 A1 | 5/2007 | Incavo et al. |
| 2007/0100462 A1 | 5/2007 | Lang et al. |
| 2007/0123991 A1 | 5/2007 | Steinberg |
| 2007/0162142 A1 | 7/2007 | Stone |
| 2007/0173858 A1 | 7/2007 | Engh et al. |
| 2008/0243258 A1 | 10/2008 | Sancheti |
| 2009/0005708 A1 | 1/2009 | Johanson et al. |
| 2009/0036993 A1 | 2/2009 | Metzger |
| 2009/0222103 A1 | 9/2009 | Fitz et al. |
| 2009/0259317 A1 | 10/2009 | Steinberg |
| 2010/0070046 A1 | 3/2010 | Steinberg |
| 2010/0160915 A1 | 6/2010 | Chauhan et al. |
| 2010/0174379 A1 | 7/2010 | McMinn |
| 2010/0280624 A1 | 11/2010 | Engh et al. |
| 2010/0312342 A1 | 12/2010 | Ek |
| 2011/0029093 A1* | 2/2011 | Bojarski .............. A61F 2/3859 623/20.35 |
| 2011/0144760 A1 | 6/2011 | Wong et al. |
| 2011/0224801 A1 | 9/2011 | Mansmann |
| 2012/0010623 A1 | 1/2012 | Bonutti |
| 2012/0059485 A1 | 3/2012 | Roger |
| 2012/0116525 A1 | 5/2012 | Brown et al. |
| 2012/0136451 A1 | 5/2012 | Fitz |
| 2012/0165821 A1 | 6/2012 | Carignan et al. |
| 2012/0197408 A1 | 8/2012 | Lang et al. |
| 2012/0209395 A1 | 8/2012 | Tepic et al. |
| 2012/0245699 A1 | 9/2012 | Lang et al. |
| 2013/0035765 A1 | 2/2013 | Dacus |
| 2013/0166035 A1 | 6/2013 | Landon |
| 2013/0226185 A1 | 8/2013 | Bonutti |
| 2014/0094813 A1 | 4/2014 | Clever et al. |
| 2014/0094819 A1 | 4/2014 | Clever et al. |
| 2014/0128973 A1 | 5/2014 | Howard et al. |
| 2014/0142713 A1 | 5/2014 | Wright et al. |
| 2014/0142714 A1 | 5/2014 | Wright et al. |
| 2014/0148909 A1 | 5/2014 | Angibaud |
| 2014/0228964 A1 | 8/2014 | Lew et al. |
| 2014/0277523 A1 | 9/2014 | Masini et al. |
| 2014/0358241 A1 | 12/2014 | Afriat |
| 2015/0196325 A1 | 7/2015 | Shenoy et al. |
| 2016/0030182 A1 | 2/2016 | McMinn |
| 2016/0045321 A1 | 2/2016 | Gabriel et al. |
| 2016/0081758 A1 | 3/2016 | Bonutti |
| 2016/0192878 A1 | 7/2016 | Hunter |
| 2016/0206331 A1 | 7/2016 | Fitz et al. |
| 2016/0235541 A1 | 8/2016 | Samuelson et al. |
| 2016/0242915 A1 | 8/2016 | Samuelson et al. |
| 2016/0242916 A1 | 8/2016 | Samuelson et al. |
| 2016/0242918 A1 | 8/2016 | Samuelson et al. |
| 2016/0242919 A1 | 8/2016 | Engh et al. |
| 2016/0256280 A1 | 9/2016 | Trauner |
| 2016/0256283 A1 | 9/2016 | Samuelson et al. |
| 2016/0256284 A1 | 9/2016 | Fitz et al. |
| 2016/0278794 A1 | 9/2016 | Boldt et al. |
| 2016/0324646 A1 | 11/2016 | Carignan et al. |
| 2016/0367373 A1 | 12/2016 | Samuelson et al. |
| 2017/0007414 A1 | 1/2017 | Fitz et al. |
| 2017/0189194 A1* | 7/2017 | Klinger ................ A61F 2/3877 |
| 2018/0325683 A1* | 11/2018 | Logan ...................... A61F 2/38 |
| 2018/0353642 A1* | 12/2018 | Lee ....................... A61F 2/4225 |
| 2019/0125541 A1* | 5/2019 | Axelson, Jr. .......... A61F 2/3877 |

FOREIGN PATENT DOCUMENTS

| | | |
|---|---|---|
| EP | 0307654 A2 | 3/1989 |
| EP | 0437173 A1 | 7/1991 |
| EP | 0676182 A1 | 10/1995 |
| EP | 0812581 A2 | 12/1997 |
| EP | 1308142 A2 | 5/2003 |
| EP | 2471494 A1 | 7/2012 |
| EP | 2572678 A1 | 3/2013 |
| EP | 2675399 A1 | 12/2013 |
| EP | 2712588 A1 | 4/2014 |
| FR | 2440185 A1 | 5/1980 |
| FR | 2615096 A1 | 11/1988 |
| FR | 2642301 A1 | 8/1990 |
| FR | 2652497 A1 | 4/1991 |
| FR | 2682590 A1 | 4/1993 |
| FR | 2700260 A1 | 7/1994 |
| FR | 2746632 A1 | 10/1997 |
| FR | 2884408 A1 | 10/2006 |
| FR | 2976176 A1 | 12/2012 |
| FR | 2997625 A1 | 5/2014 |
| GB | 1522497 A | 8/1978 |
| GB | 2301032 A | 11/1996 |
| GB | 2433698 A | 7/2007 |
| GB | 2461149 A | 12/2009 |
| JP | 5465475 B2 | 4/2014 |
| WO | 9300871 A1 | 1/1993 |
| WO | 9522303 A2 | 8/1995 |
| WO | 9725006 A1 | 7/1997 |
| WO | 03068119 A2 | 8/2003 |
| WO | 2014159919 A1 | 10/2014 |
| WO | 2016026007 A1 | 2/2016 |

\* cited by examiner

CONICAL PATELLA RESURFACING

CROSS-REFERENCE TO RELATED APPLICATIONS

The present application claims the benefit of the filing of U.S. Provisional Patent Application No. 62/581,081, filed Nov. 3, 2017, the disclosure of which is hereby incorporated herein by reference.

FIELD OF INVENTION

The present invention relates to patellar implants and methods for bone preparation, and in particular to a patellar implant with a recess and methods for preparing bone to receive the same.

BACKGROUND OF THE INVENTION

Patella resurfacing is routinely performed for treatments of various knee ailments including arthritis. After resurfacing the patella, a surgeon may implant a patellar implant on the resurfaced patella. The patellar implant generally has a patella contacting surface for engaging the resurfaced patella and an opposite surface that articulates with a distal end of a femoral body. The patella contacting surface is generally planar in shape to allow for attachment with a resected patella. A properly sized and configured patellar implant is required to ensure proper patellofemoral kinematics and prevent detachment from the natural patellar bone.

Bone interfacing geometries between the patellar implant and the resected patella generally consist of simple planar shapes because of the complexities of resecting patellar bone. Simple planar shapes limit patella implant design and may prevent patellar implant designs with varying thickness. For example, increasing the thickness of the patellar implant in regions of high mechanical stress and decreasing the thickness of the patellar implant in regions where maximizing bone preservation is desired are generally not possible on account of the simple planar shapes at the bone interfacing surfaces. Furthermore, patellar resurfacing is generally performed with little assistance from anatomical landmark registration. It is common to use only articulating surface high points as anatomical landmarks in conjunction with cutting clamps to perform the resection. This may result in improper patella sizing and increase the risk of patellar implant detachment.

Patellar implants are typically secured to a resected patella surface by either an onlay or an inlay technique. An onlay technique utilizes fixation features such as posts extending from the patellar implant which are received in corresponding recesses on the resected patella surface. Onlay technique, however, requires extensive patellar bone removal and may consequently weaken the resected patella and increase the risk of patella fracture. An inlay technique is performed by resecting a footprint of the patellar implant on the resecting surface and press-fitting the patellar implant into this recess. While the inlay technique may require less patellar bone removal, the patellar implant may not be embedded deep enough into the patella to provide the same level of fixation as achieved by utilizing an onlay technique. Further, the inlay technique may result in sharp, jagged bone fragments along the interface with the patellar implant and may consequently damage the patellar implant.

Therefore, there exists a need for improved patellar implants and methods for attaching the same to prepared bone.

BRIEF SUMMARY OF THE INVENTION

Disclosed herein are patellar implants and methods for bone preparation to secure the same.

In a first aspect of the present invention, a patellar implant is provided. The patellar implant may include a posterior articulating surface an anterior surface for engaging a resected patellar bone. The posterior articulating surface may engage a femoral body. The anterior surface may be opposed to the posterior surface. The anterior surface may include a conically shaped portion. The conically shaped portion may extend and taper towards the posterior surface such that the resected patellar bone may be received in the conically shaped portion to secure the patellar implant to the resected patellar bone.

In accordance with the first aspect, the anterior surface may include a flat peripheral base disposed around a circumference of the conically shaped portion. A thickness of the resected patellar bone may be disposed within the conically shaped portion when the patellar implant is secured to the resected patellar bone. The thickness may be defined by a distance between a base and an apex of the conically shaped portion. The conically shaped portion may include at least one projection extending away from the anterior surface. The anterior surface may be a porous layer. A solid layer may be disposed between the porous layer and the polymeric layer.

Further in accordance with the first aspect, the posterior articulating surface may be symmetrically shaped to the anterior surface. The posterior articulating surface may include a median ridge portion extending posteriorly to and disposed between a lateral portion and a medial portion. The median ridge portion may extend along a first length in a superior to inferior direction and along a second length in a medial to lateral direction of the articulating surface. The first length may be greater than the second length. The median ridge portion may be elliptical in shape. The first length may be a major axis and the second length may be a minor axis of the median ridge portion respectively. The major axis may define a boundary between a medial side and a lateral side of the median ridge. The medial side may have one or more curves defined by a curve center located laterally to the major axis. The lateral side may have one or more curves defined by a curve center located medially to the major axis.

In a second aspect of the present invention, a patellar implant is provided. The patellar implant may include a posterior articulating surface for engaging a femoral body and an anterior surface for engaging a resected patellar bone. The anterior surface may include a recessed portion. The recessed portion may extend and taper towards the posterior surface such that the resected patellar bone may be received in the recessed portion to secure the patellar implant to the resected bone. The posterior articulating surface may include a median ridge portion extending posteriorly to and disposed between a lateral portion and a medial portion. The median ridge portion may extend along a first length in a superior to inferior direction and along a second length in a medial to lateral direction of the articulating surface. The first length may be greater than the second length.

In accordance with the second aspect, the median ridge portion may be elliptical in shape. The first length may be a major axis and the second length may be a minor axis of the median ridge portion respectively. The major axis may define a boundary between a medial side and a lateral side of the median ridge. The medial side may have one or more curves defined by a curve center located laterally to the major axis. The lateral side may have a one or more curves defined by a curve center located medially to the major axis.

A third aspect of the present invention is a method resurfacing a patellar bone to receive a patellar implant having a recessed anterior. A method in accordance with this aspect of the invention may include the steps of obtaining imaging of a patellar bone, determining from the obtained imaging a minimum implant depth of the patellar implant, determining optimum medial and lateral patellar slope angles of the patellar implant, selecting a symmetrical reamer and resecting the patellar bone. The minimum implant depth may be defined by a distance between a base and an apex of the recessed anterior surface of the patellar implant. Selecting a symmetrical reamer may be based on the minimum implant depth and medial-lateral patellar slope angles. The patellar bone may be resected with the symmetrical reamer such that the recessed anterior surface of the patellar implant may encompass at least a portion of the resected patellar bone. The step of determining a minimum implant depth of the conical patellar implant may include determining a patient specific patellar tilt angle.

BRIEF DESCRIPTION OF THE DRAWINGS

A more complete appreciation of the subject matter of the present invention and the various advantages thereof may be realized by reference to the following detailed description, in which reference is made to the following accompanying drawings.

DETAILED DESCRIPTION

In describing preferred embodiments of the disclosure, reference will be made to directional nomenclature used in describing the human body. It is noted that this nomenclature is used only for convenience and that it is not intended to be limiting with respect to the scope of the invention.

As used herein, when referring to bones or other parts of the body, the term "anterior" means toward the front part or the face and the term "posterior" means toward the back of the body. The term "medial" means toward the midline of the body and the term "lateral" means away from the midline of the body. The term "superior" means closer to the head and the term "inferior" means more distant from the head.

Figure 1:
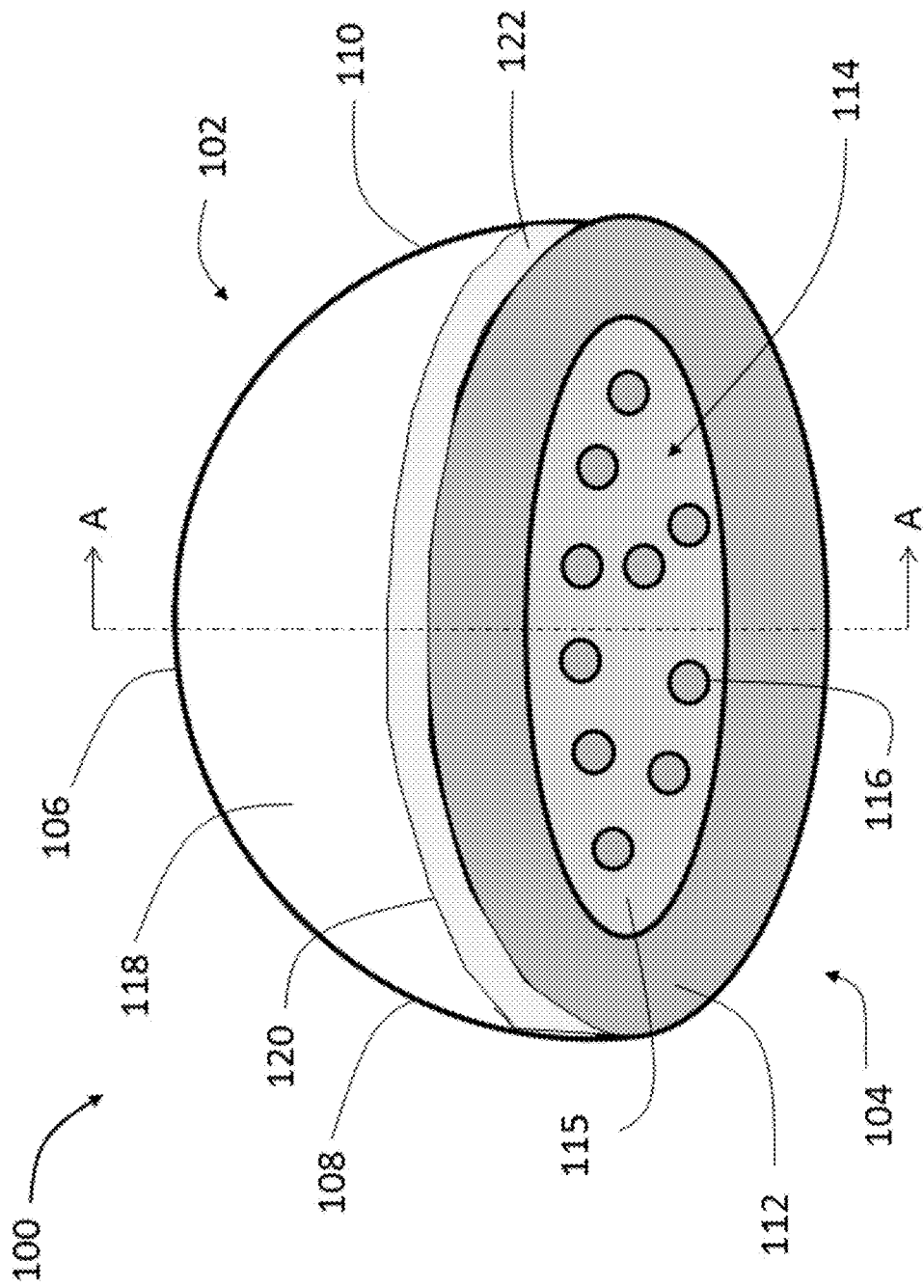
FIG. 1 is a bottom perspective view of a patellar implant according to a first embodiment of the present invention.

FIG. 1 shows a patellar implant 100 according to an embodiment of the present invention. Patellar implant 100 includes an articulating posterior surface 102 and an opposite anterior surface 104. Posterior surface 102 is symmetrically shaped and includes a median side 106, a lateral side 108 and a medial side 110. The posterior surface is configured to articulate with a distal end portion of a femoral body (not shown). While a symmetrically shaped posterior surface is shown in this embodiment, other embodiments may have anatomically shaped posterior surfaces as described below. Anterior surface 104 is configured to contact a resected patellar bone (not shown). A flat peripheral base 112 is disposed around a conical recess 114. The conical recess tapers and extends towards the posterior surface and includes sidewalls 115. Sidewalls 115 can have projections 116 disposed all across the sidewalls or positioned in strategic locations to improve fixation with resected patellar bone.

Figure 2:
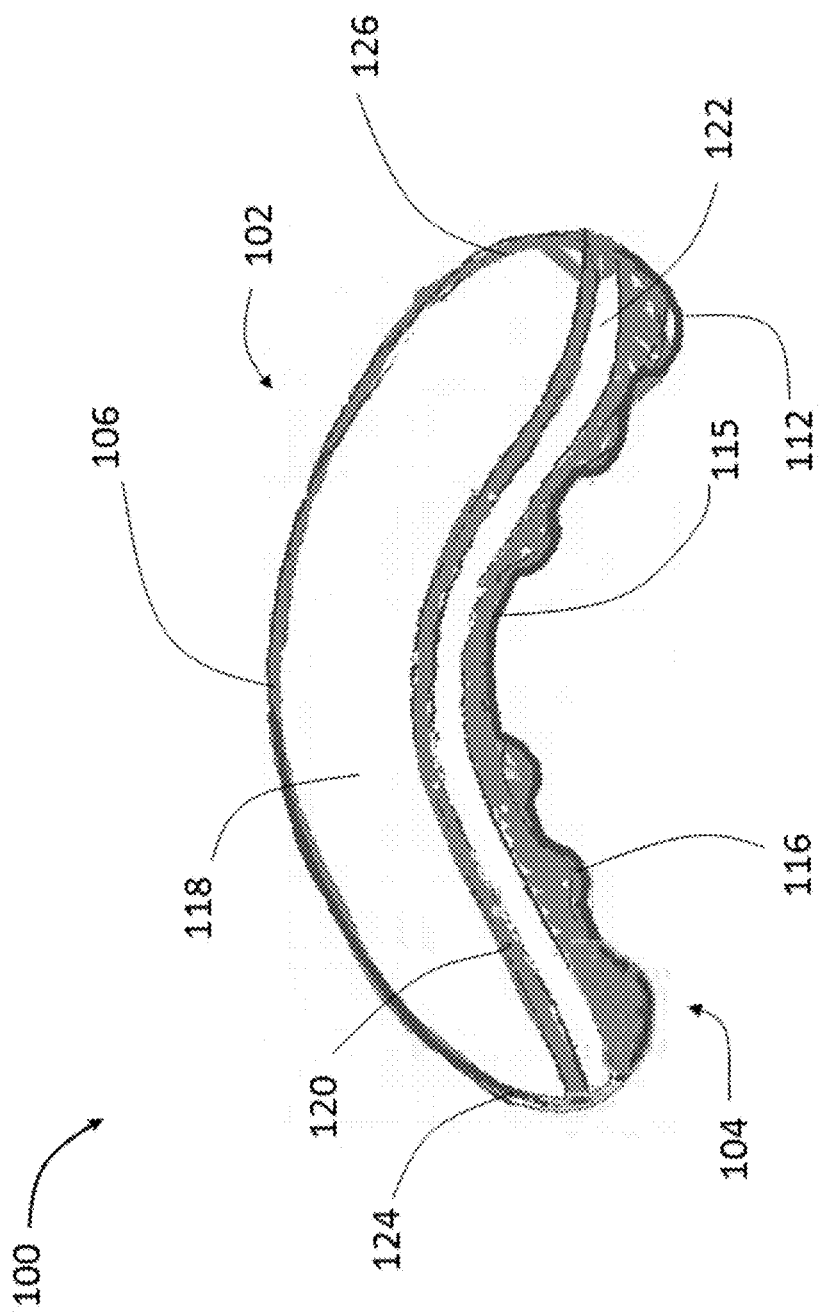
FIG. 2 is a front cross-sectional view along line A-A of the patellar implant of FIG. 1.

Referring now to FIG. 2, there is shown a cross-section of patellar implant 100. Anterior surface 104 includes a porous exterior layer to allow for attachment and bone ingrowth between the resected patella and patellar implant 100. The porous layer is provided all across the anterior surface including sidewalls 115 of conical recess 114 and projections 116. A solid layer 122 is disposed between anterior surface 104 and posterior surface 106. The solid layer 122 encircles a base of the conical recess 114 as best shown in FIG. 1. The solid layer may be made of a suitable metal, whereas the posterior surface may be made of a polymer. The porous-solid-polymer composition provides patellar implant 100 with ideal strength, bone attachment and femoral kinematic characteristics. Solid layer 122 reinforces the anterior surface of patellar implant 100 and also facilitates attachment with the resected patella by compressing the implant around the natural patellar bone. Polymer surface 118 provides a soft and smooth interface to reduce friction between patellar implant 100 and the femoral body.

Figure 3:
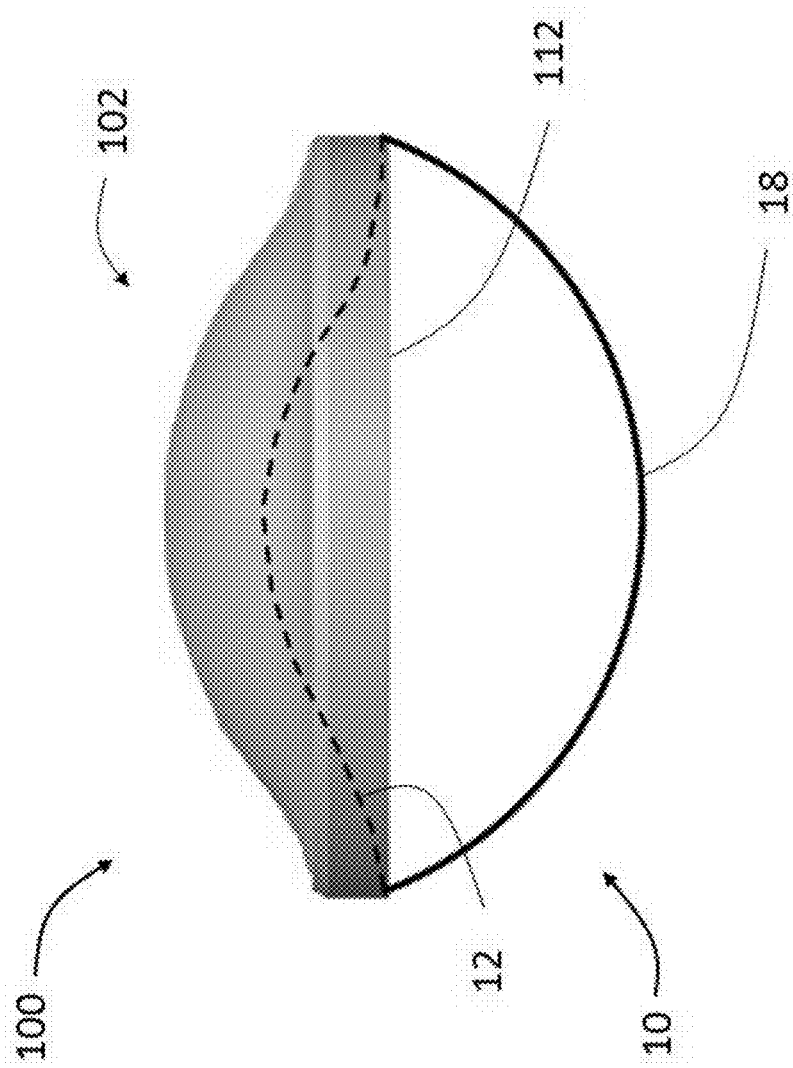
FIG. 3 is a side view of the patellar implant of FIG. 1 in conjunction with a resected patella.

FIG. 3 shows patellar implant 100 positioned on a resected patella 10. Resected patella surface 12 of patella 10 matches anterior surface 104 of patellar implant 100. This allows patellar implant 100 to be seamlessly placed and secured to the resected patella. As shown here, bone removal from patella 10 is minimized, which in turn allows to maximize natural bone retention at the center of the patella. Maximum bone retention at the center of patella 10 allows the natural patellar bone to protect against articulating forces. Minimizing bone removal also ensures that the rigidity of the natural patellar bone construct is maintained after patellar resection. As best seen in FIG. 2, patellar implant 100 has uniform thickness across the implant and thereby distributes forces evenly across the resected patella.

The enlarged anterior surface 104 area, which includes sidewalls 115 of the conical recess 114, provides a much larger contact surface area between patellar implant 100 and patella 10. The sidewalls of conical recess 114 fully encompass and secure at least a portion of resected patella 10 as best shown in FIG. 3. Furthermore, the porous layer, projections 116 and solid layer 122, which is wrapped around the conical recess, further reinforce the attachment between patella 10 and patellar implant 100.

Figure 4:
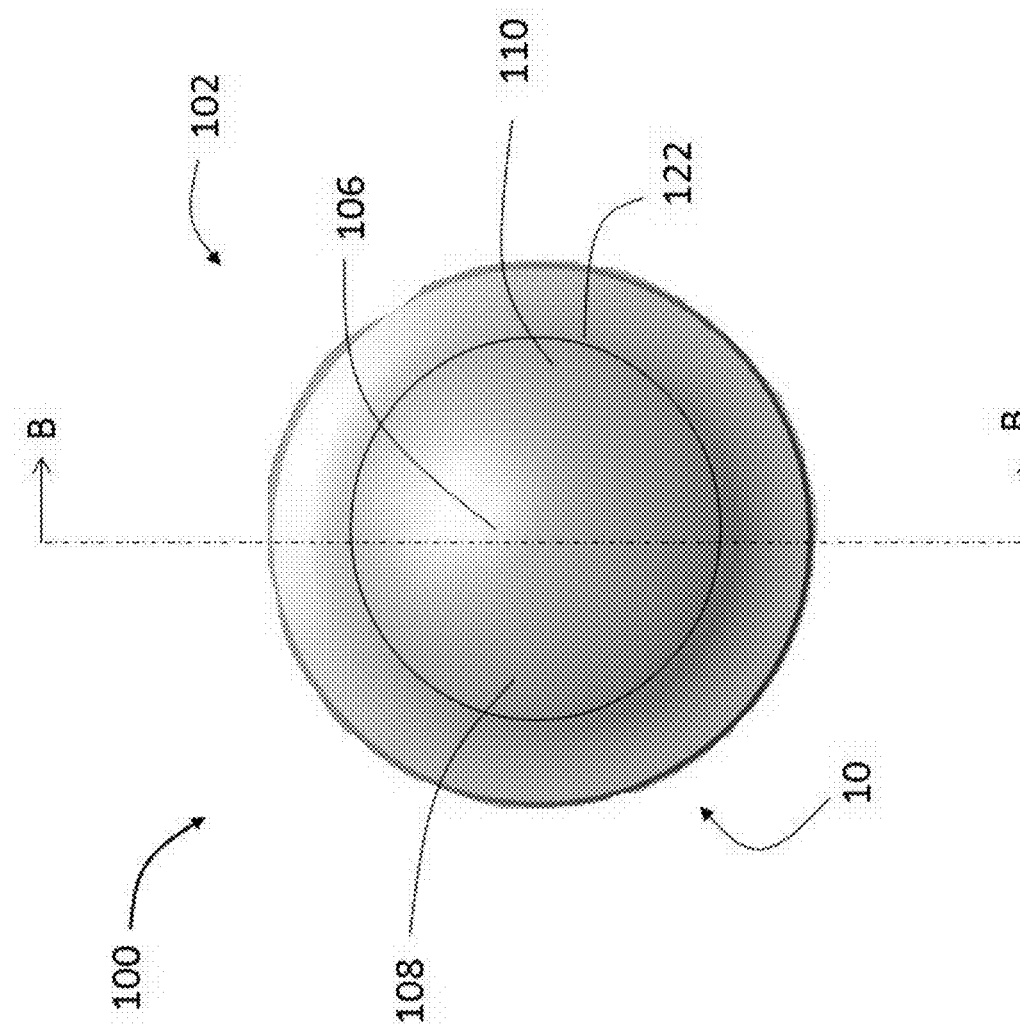
FIG. 4 is a top view of the patellar implant of FIG. 1.

FIG. 4 shows a top view of patellar implant 100 placed over resected patella 10. In this embodiment, patellar implant 10 is sized to completely cover resected patella 10 with no undercap or overhang. Overhang occurs when the footprint of the implant is larger than the footprint of the resected patella, and undercap 136 occurs when the footprint of the implant is smaller than the footprint of the resected patella. Other embodiments may have a patellar implant with an overhang or an undercap depending on implant selection and/or patient specific needs.

Figure 5:
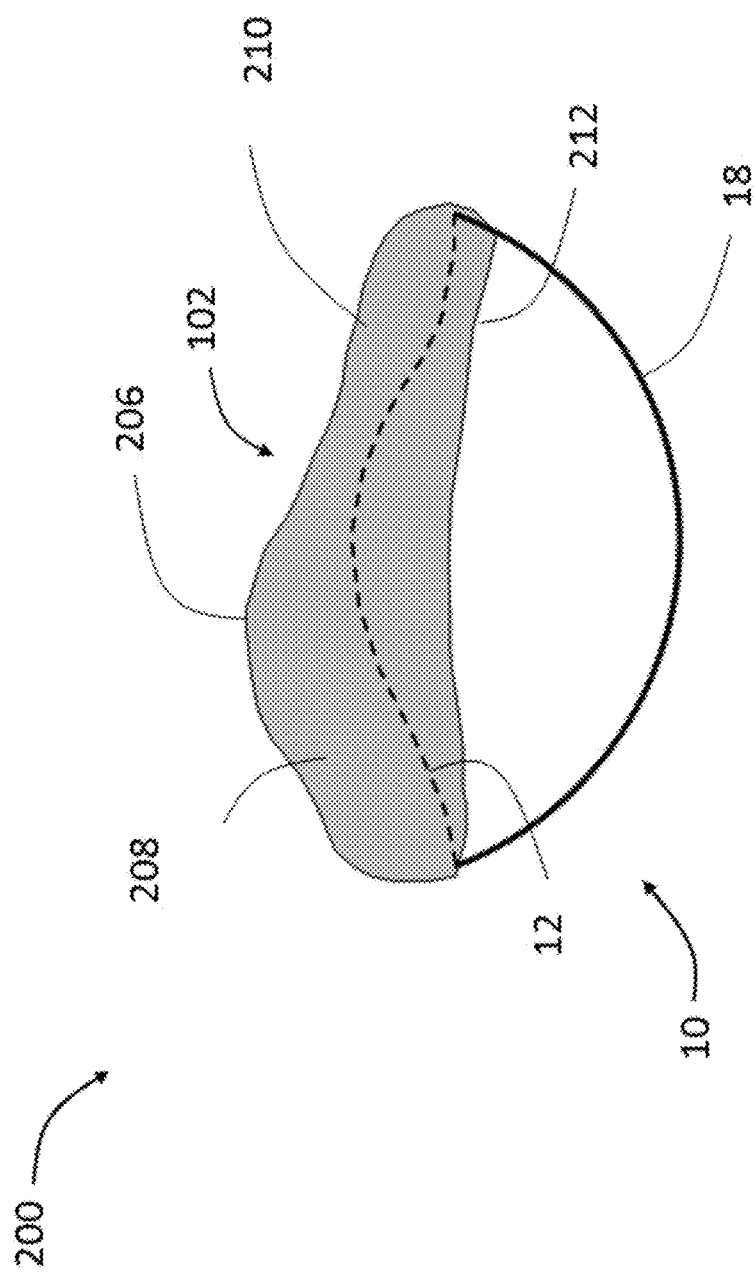
FIG. 5 is a side view of a patellar implant and a resected patella according to another embodiment of the present invention.

Referring now to FIG. 5, there is shown a patellar implant 200 according to another embodiment of the present invention attached to resected patella 10. Patellar implant 200 is similar to patellar implant 100, and therefore like elements are referred to with similar numerals within the 200-series of numbers. For instance, patellar implant 200 includes flat peripheral base 212 and conical recess 214 with sidewalls 215 (not shown). However, patellar implant has an anatomically-shaped posterior surface 202. Patellar implant 200 has a median ridge 206 separating a medial facet 210 and a lateral facet 208. The anatomically shaped posterior surface allows for improved patellofemoral kinematics. Posterior surface 202 is anatomically shaped to match contours of the articulating surface of a natural patella, and thereby replicates natural patellofemoral kinematics during flexion and extension. Median ridge 206, medial facet 210 and lateral facet 208 may be configured as described in U.S. Provisional Application No. 62/580,575, the entire disclosure of which is incorporated herein by reference.

Figure 6A:
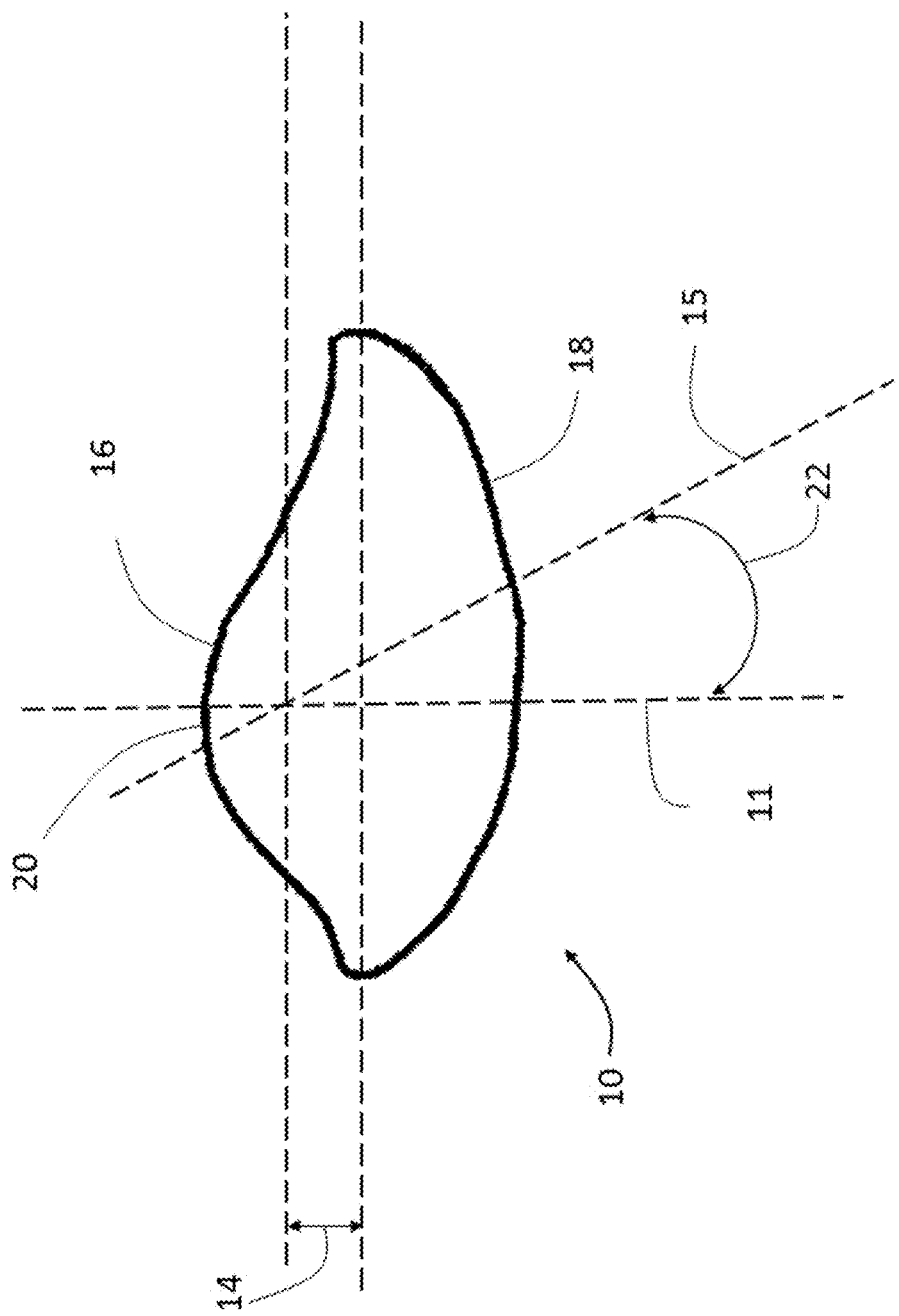
FIGS. 6A and 6B are schematic side views of a patella showing steps for patellar resection according to an embodiment of the present invention.
Figure 6B:
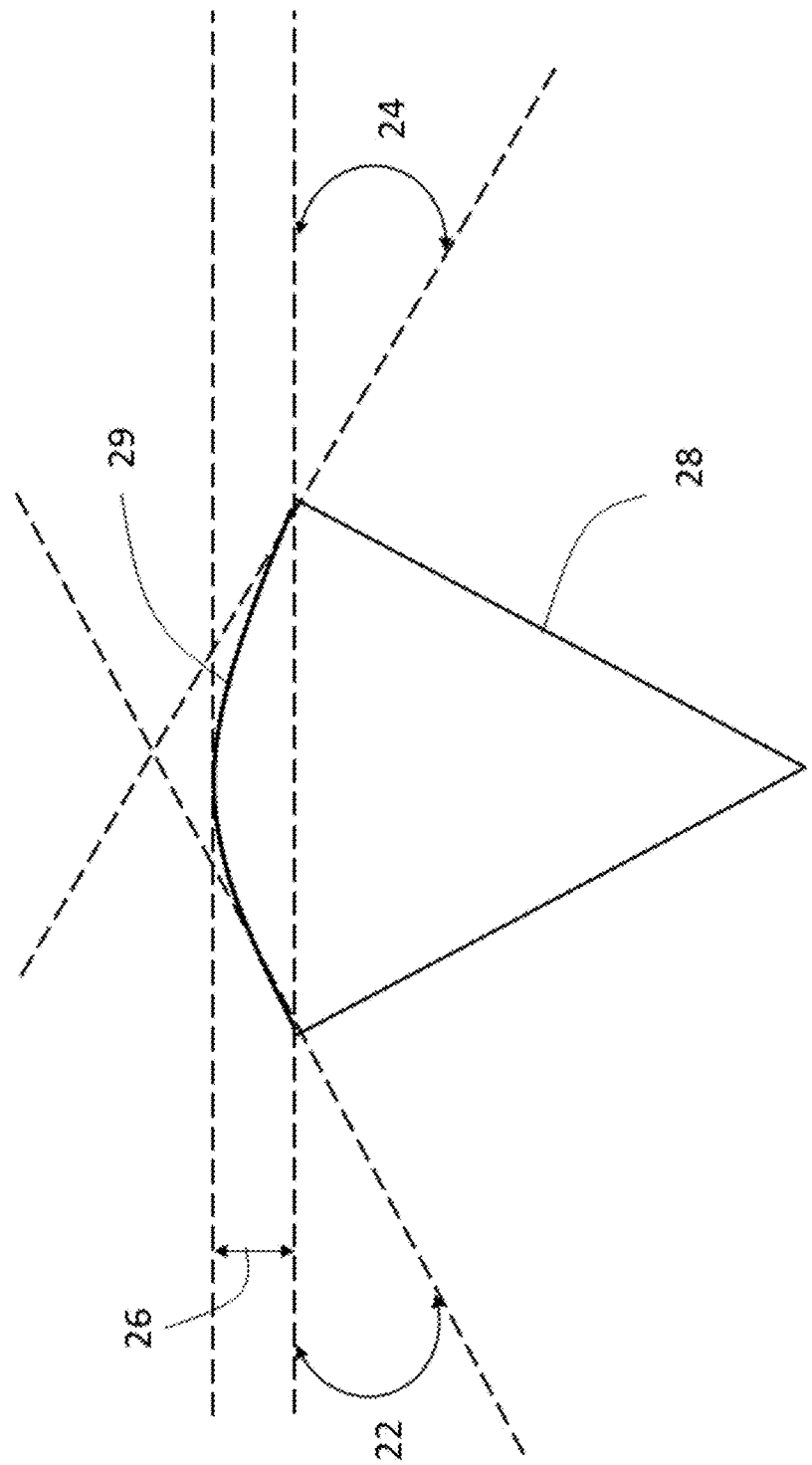

FIGS. 6A and 6B show a method for resecting patella 10 according to another embodiment of the present invention. While the resection method disclosed herein references patellar implant 100, patellar implant 200 or other similar patellar implants may also be used in conjunction with this method. A minimum patella resection depth 14 is first determined as shown in FIG. 6A. Depth 14 denotes the thickness of resected patella 10 which will be encased within the conical recess 114 of patellar implant 100. Minimum depth 14 represents minimum thickness required to prevent detachment of patellar implant 100 from patella 10. Ensuring that only a minimum thickness is resected, i.e., minimum bone removal, allows natural patellar bone retention. A patellar central axis 11 is determined on a patellar model obtained by X-ray, CT scan or other visualization techniques. The patellar model will allow for bony mass determination and the proper location of central axis 11. A patellar tilt axis 15 is determined based on patient specific patellar-femoral geometry and kinematics. A patellar tilt angle 22 defined between central axis 11 and patellar tilt axis 15 denotes patellar depth as shown in FIG. 6A.

Figure 6C:
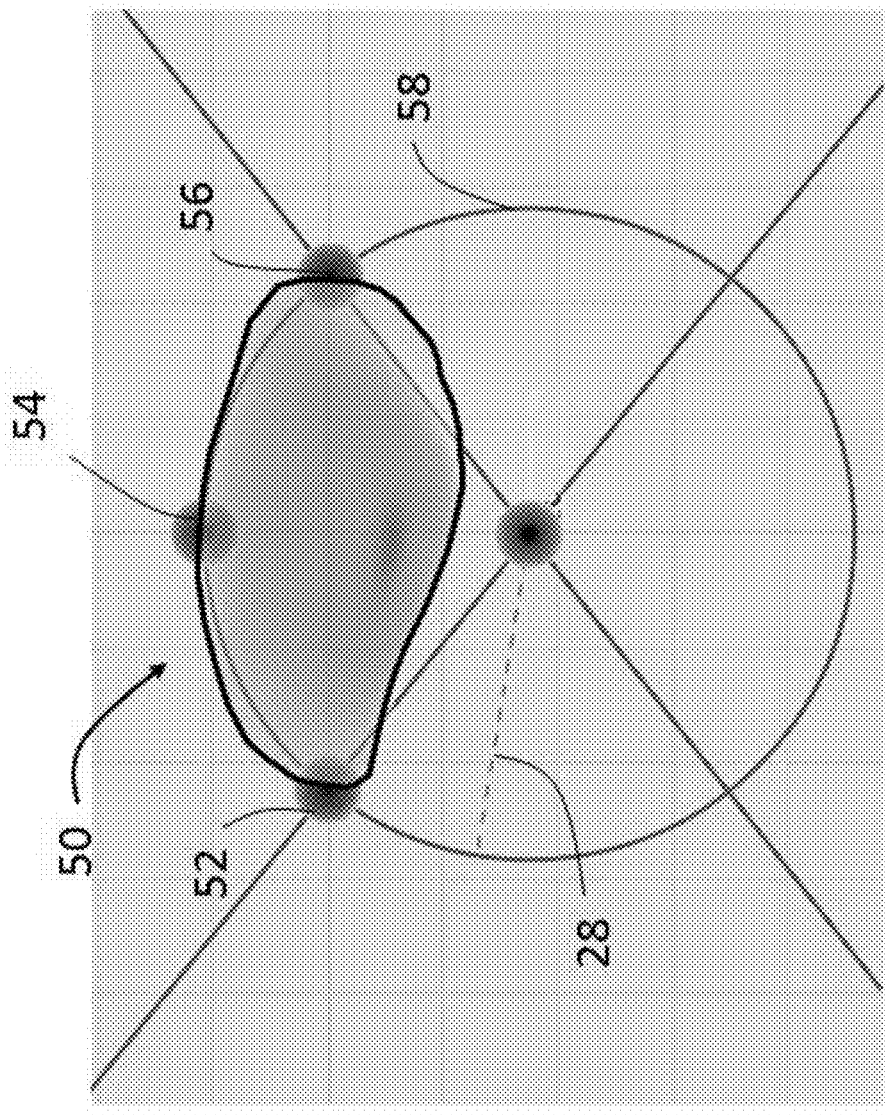
FIG. 6C shows a schematic side view of a patella showing steps for patellar measurement according to another embodiment of the present invention.

Referring now to FIG. 6B, a patellar surface curvature 29 is determined by medial-lateral slope angles. Optimum medial patellar slope angle 22 and lateral patellar slope angle 24 are determined from the patella model. These values are averaged to compute a radius 28 for a symmetrical conical reamer 30 shown in FIG. 8. Additionally, patient databases for standard patellar sizes and shape may be factored in calculating radius 28 in order to minimize bone removal while simultaneously fitting a predetermined population sample. For example, as shown in FIG. 6C, radius 28 of an unresected patella 50 representing a sample population is determined by locating peripheral edges 52, 54 and 56. A circle 58 joining these peripheral edges is defined by radius 28. Similar measurements across multiple samples can be used to compile a database for standard patellar sizes. By way of example only and not limitation, radius 28 for males is generally around 31.1±3.5 mm for females is generally around 27.4±3.3 mm based on scans of global population groups.

Figure 8:
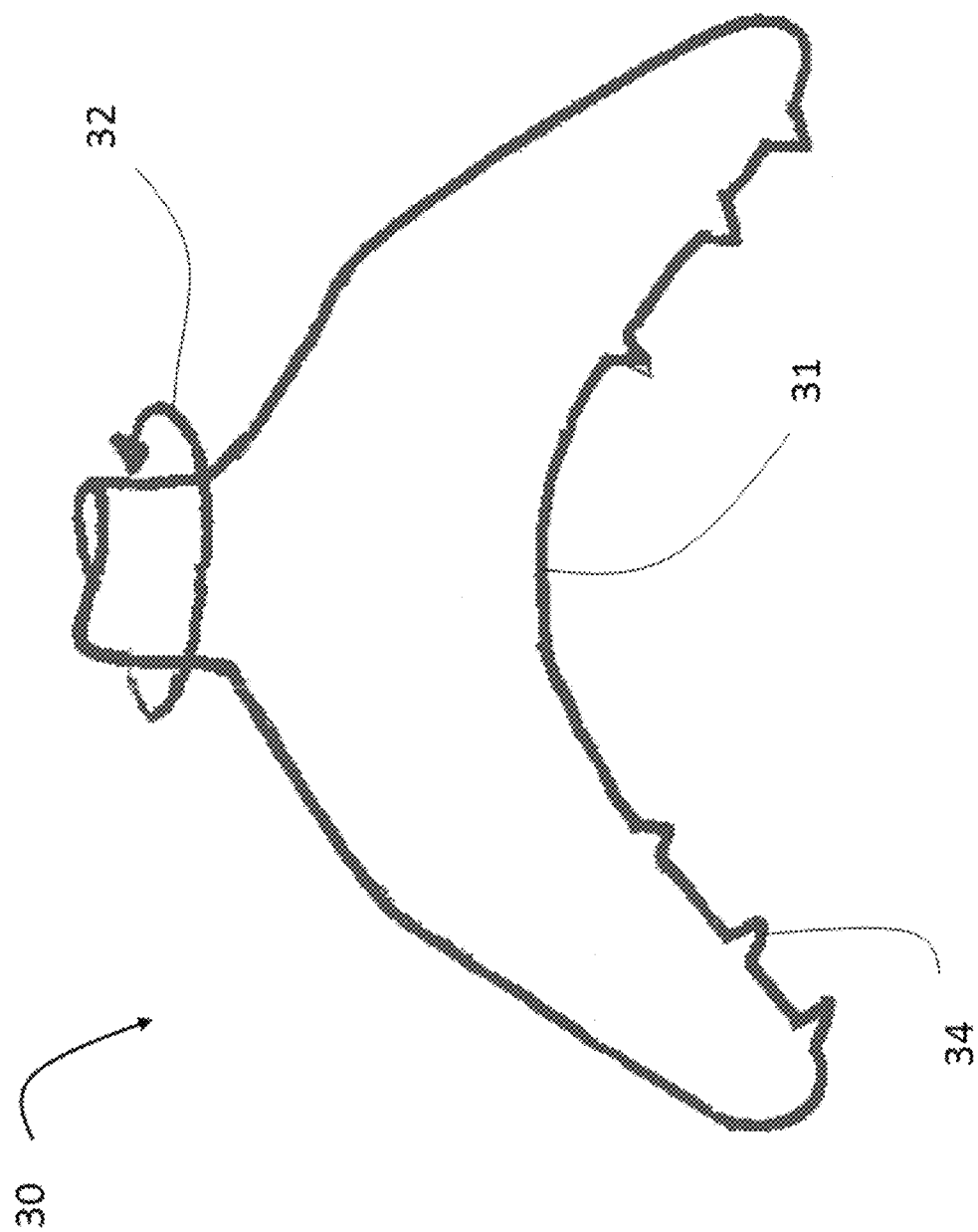
FIG. 8 is a side view of a symmetrical reamer for patella preparation.

As shown in FIG. 8, conical reamer 30 includes teeth 34 to cut grooves in patella 10 to maximize surface area for patellar implant 100 fixation. Central curvature 31 of conical reamer 30 is identical to the resected patellar surface curvature 29.

Figure 7:
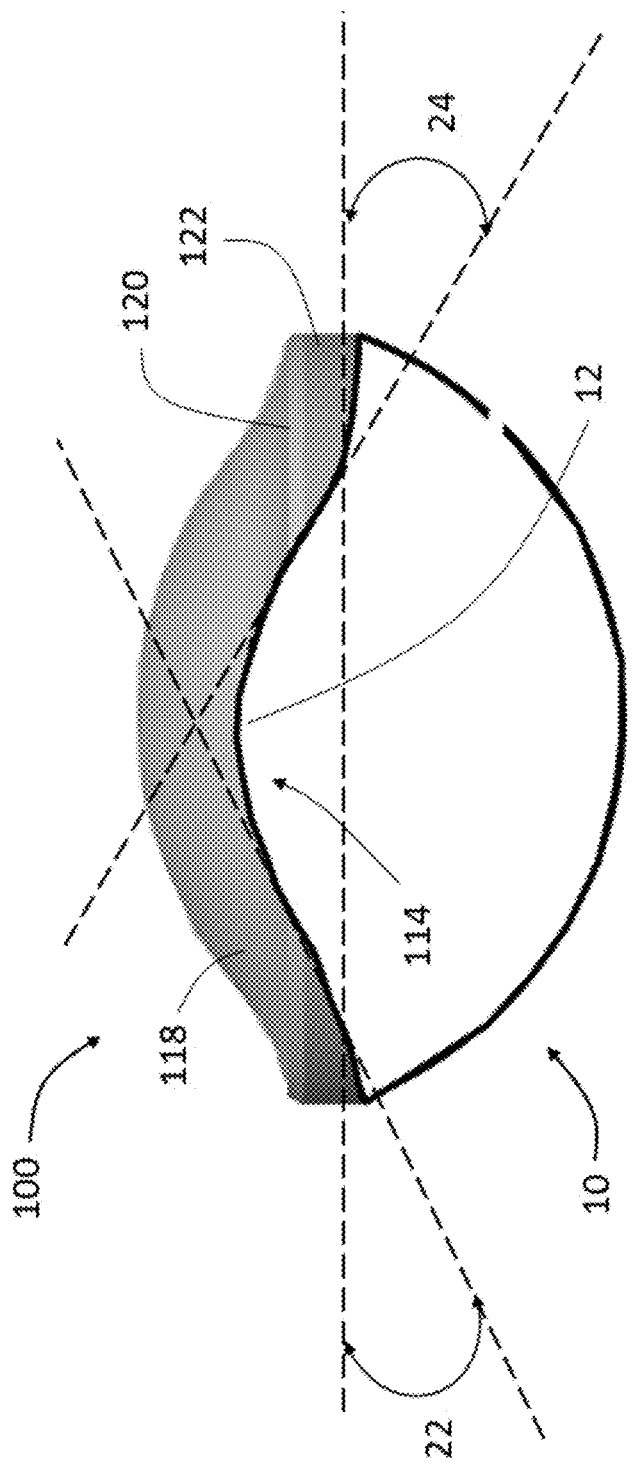
FIG. 7 is side cross-sectional view along line B-B of the patellar implant of FIG. 4.

Referring now to FIG. 7, there is shown patellar implant 100 placed on resected patella 10. The conical reamer selection, based on average radius 28, ensures that resected patella surface 12 forms a seamless fit with patellar implant 100. Resected surface 12 corresponds not only to the anterior surface of the recessed patellar implant 100, it also resembles the articulating surface of the natural patella. Hence, bone retention of the natural patella is maximized while ensuring that patellar implant 100 has a generally uniform thickness.

While a patellar implant described in these embodiments have conically shaped anterior surface recesses, other implants may cylindrical, rectangular or similarly shaped recesses. Implants described herein may be made from polymers such as PEEK, carbon fiber reinforced PEEK, PAEK, UHMWPE, metals, ceramics, combinations of the foregoing, or other suitable materials that are biocompatible and possess sufficient strength and rigidity as described above. Additive manufacturing techniques such as 3D printing may be used to fabricate implants of the present invention.

Furthermore, although the invention disclosed herein has been described with reference to particular features, it is to be understood that these features are merely illustrative of the principles and applications of the present invention. It is therefore to be understood that numerous modifications, including changes in the sizes of the various features described herein, may be made to the illustrative embodiments and that other arrangements may be devised without departing from the spirit and scope of the present invention. In this regard, the present invention encompasses numerous additional features in addition to those specific features set forth in the paragraphs below. Moreover, the foregoing disclosure should be taken by way of illustration rather than by way of limitation as the present invention is defined in the examples of the numbered paragraphs, which describe features in accordance with various embodiments of the invention, set forth in the claims below.

The invention claimed is:

1. A patellar implant comprising:
   a posterior articulating surface for engaging a femoral body, and
   an anterior surface for engaging a resected patellar bone, the anterior surface opposed to the posterior surface,
   wherein the anterior surface includes a conically shaped recess, a substantially circular opening to the conically shaped recess defined by a flat peripheral base of the anterior surface disposed around a circumference of the opening, the conically shaped recess tapering from the opening towards the posterior surface such that the resected patellar bone is configured to be received in the conically shaped recess to secure the patellar implant to the resected patellar bone.

2. The patellar implant of claim 1, wherein a thickness of the resected patellar bone is disposed within the conically shaped recess when the patellar implant is secured to the resected patellar bone, the thickness being defined by a distance between the opening and an apex of the conically shaped recess.

3. The patellar implant of claim 1, wherein the conically shaped recess includes at least one projection extending away from the anterior surface.

4. The patellar implant of claim 1, wherein the anterior surface is a porous layer.

5. The patellar implant of claim 4, wherein the posterior surface is a polymeric layer.

6. The patellar implant of claim 5, wherein a solid layer is disposed between the porous layer and the polymeric layer.

7. The patellar implant of claim 1, wherein the posterior articulating surface is symmetrically shaped to the anterior surface.

8. The patellar implant of claim 1, wherein the posterior articulating surface includes a median ridge portion extending posteriorly to and disposed between a lateral portion and a medial portion, wherein the median ridge portion extends along a first length in a superior to inferior direction and along a second length in a medial to lateral direction of the articulating surface, the first length being greater than the second length.

9. The patellar implant of claim 8, wherein the median ridge portion is elliptical in shape.

10. The patellar implant of claim 8, wherein the first length is a major axis and the second length is a minor axis of the median ridge portion respectively.

11. The patellar implant of claim 10, wherein the major axis defines a boundary between a medial side and a lateral side of the median ridge, the medial side having one or more curves defined by a curve center located laterally to the major axis, the lateral side having a one or more curves defined by a curve center located medially to the major axis.

12. A patellar implant comprising:
a posterior articulating surface for engaging a femoral body, and
an anterior surface for engaging a resected patellar bone, wherein the anterior surface includes a recessed portion,
a substantially circular opening to the recessed portion defined by a flat peripheral base of the anterior surface disposed around a circumference of the opening, the recessed portion tapering from the opening towards the posterior surface such that the resected patellar bone is received in the recessed portion to secure the patellar implant to the resected bone.

13. The patellar implant of claim 12, wherein the posterior articulating surface includes a median ridge portion extending posteriorly to and disposed between a lateral portion and a medial portion, wherein the median ridge portion extends along a first length in a superior to inferior direction and along a second length in a medial to lateral direction of the articulating surface, the first length being greater than the second length.

14. The patellar implant of claim 13, wherein the median ridge portion is elliptical in shape.

15. The patellar implant of claim 14, wherein the first length is a major axis and the second length is a minor axis of the median ridge portion respectively.

16. The patellar implant of claim 15, wherein the major axis defines a boundary between a medial side and a lateral side of the median ridge, the medial side having one or more curves defined by a curve center located laterally to the major axis, the lateral side having a one or more curves defined by a curve center located medially to the major axis.

* * * * *